United States Patent
Jamieson

Patent Number: 5,096,378
Date of Patent: Mar. 17, 1992

[54] CONTROL OF A WIND TURBINE

[75] Inventor: Peter M. Jamieson, Stirling, Scotland

[73] Assignee: Howden Wind Turbines Limited, Glasgow, Scotland

[21] Appl. No.: 513,802

[22] Filed: Apr. 24, 1990

[51] Int. Cl.⁵ .............................................. F03D 7/04
[52] U.S. Cl. .................................. 416/23; 416/88; 416/135; 416/44
[58] Field of Search ............... 416/23, 44, 50, 52, 416/131, 133, 135, 137, 139, 140, DIG. 7, 24, 87–89

[56] References Cited

U.S. PATENT DOCUMENTS

| | | | |
|---|---|---|---|
| 1,656,019 | 1/1928 | Roberts | 416/23 |
| 2,026,482 | 12/1935 | Mattioli | 416/23 |
| 2,622,686 | 12/1952 | Chevreau et al. | 416/23 |
| 2,625,997 | 1/1953 | Doak | 416/23 |
| 3,128,966 | 4/1964 | Alvarez-Calderon | 416/23 X |
| 4,355,955 | 10/1982 | Kisovec | 416/139 A X |

FOREIGN PATENT DOCUMENTS

| | | | |
|---|---|---|---|
| 200823 | 11/1986 | European Pat. Off. | |
| 97081 | 6/1982 | Japan | 416/DIG. 7 |
| 542023 | 2/1977 | U.S.S.R. | 416/23 |
| 1137253 | 1/1985 | U.S.S.R. | 416/23 |
| 1281740 | 1/1987 | U.S.S.R. | 416/44 |
| 352811 | 7/1931 | United Kingdom | 416/23 |

Primary Examiner—Edward K. Look
Assistant Examiner—James A. Larson
Attorney, Agent, or Firm—Barnes & Thornburg

[57] ABSTRACT

A wind turbine generator blade includes a movable front portion, extending from the faster-moving blade tip in a span-wise direction along the blade, and mounted on a pivot axis permitting the front portion to be displaced to a "high drag" position in which it has a high negative angle of incidence which will in turn give rise to a high negative angle of attack to the relative airflow and hence an increased drag tending to slow down an overspeeding blade, but will also give rise to an increased lift which assists in slowing down the overspeeding blade. It has been found that a truncated aerofoil section such as that used for the front blade portion has a relatively high stalling angle, allowing its use in conditions such that the angle of attack may approach 30° without stalling of the front blade portion, but in the presence of a considerably increased total drag on the blade.

19 Claims, 3 Drawing Sheets

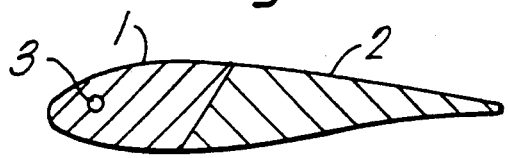
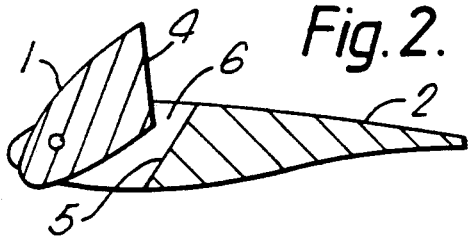
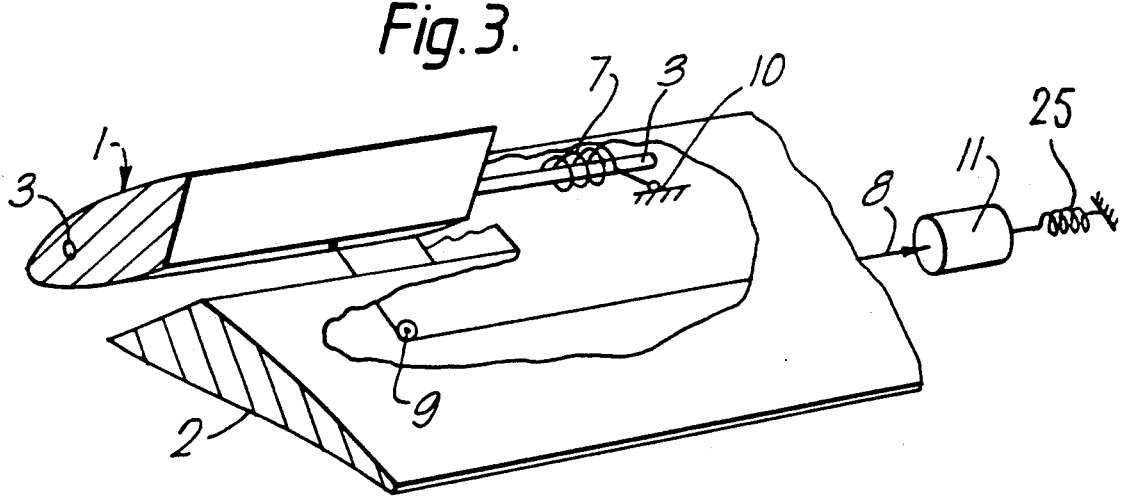
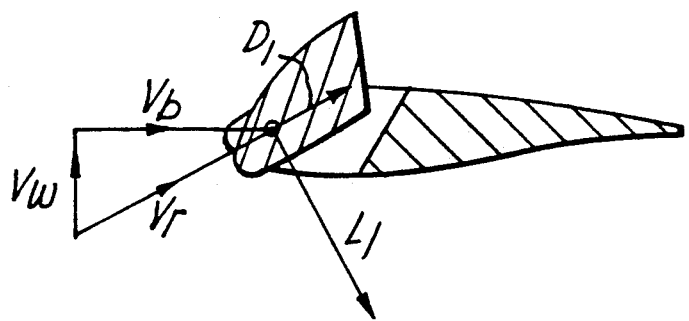

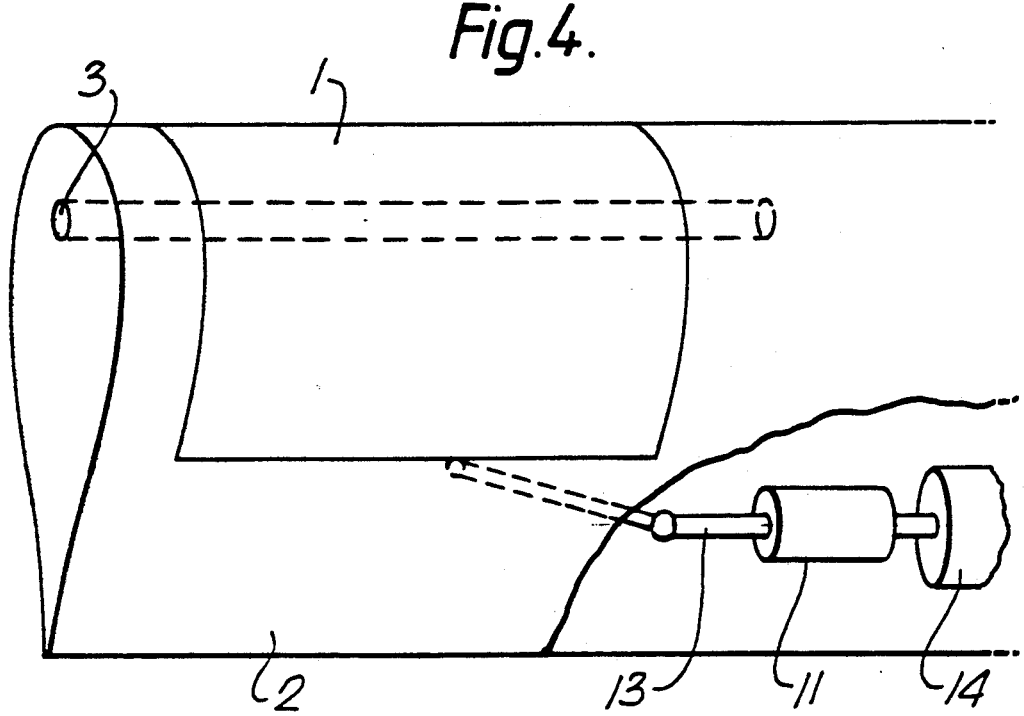
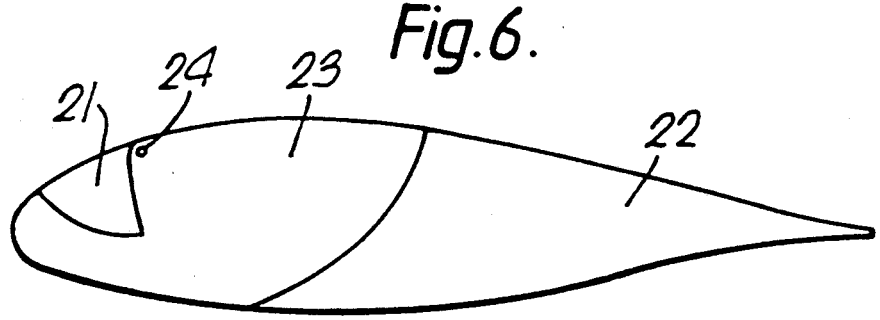
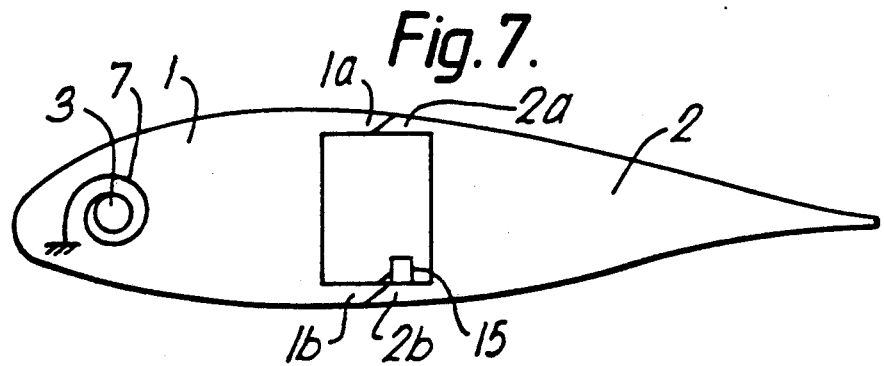

CONTROL OF A WIND TURBINE

FIELD OF THE INVENTION

The present invention relates to a method of controlling a wind turbine for limiting the power output in high winds and preventing overspeed when the load is lost while in operation. The invention also provides a wind turbine blade useful in the method and a wind turbine rotor itself incorporating such a blade.

PRIOR ART

In the past the problem of power limiting of wind turbines has been recognized and various solutions have been offered. For example, it has been proposed that the angle of incidence of the entire blade be reduced to reduce power, but this gives rise to considerable bending forces due to the aerodynamic loads on the blades, and also requires very heavy bearings in order to resist these forces and to provide for rotation of the entire blade.

It has also been proposed that the part of the blade near the faster moving tip be rotated to a lower or even a negative angle of incidence, without rotating the rest of the blade, but here again the cantilevered mounting of the rotated portion places considerable demands on the design of the blade in order to achieve the desired structural integrity and resistance to bending under such "power-shedding" rotation.

Yet a further proposal disclosed in our EP-A-0200823 involves moving a part of the blade section incorporating the leading end of the aerofoil section of the blade longitudinally of the blade in order to increase drag on the blade as a whole, and to displace that movable portion such that its distance from the axis of rotation of the blade is greater and hence increasing the moment arm and consequently the torque generated by the increased drag. However, here again sophisticated mounting mechanisms are required firstly in order to provide for the longitudinal guiding of the movable portion of the blade, and secondly the maintenance of adequate continuity of the airflow-guiding principal surfaces of the blade when in the low drag configuration with the movable portion in place in front of the fixed rear portion of the blade.

OBJECT OF THE INVENTION

It is an object of the present invention to provide a method of reducing the power generated by a wind turbine rotor, when desired, and to provide a wind turbine blade designed to enable that method to be carried out.

SUMMARY OF THE INVENTION

According to a first aspect of the present invention there is provided a blade for a turbine, comprising first and second parallel blade portions the blade having a first configuration in which the first and second parallel blade portions have a first relative positioning in which they co-operate in forming an aerofoil section for airflow-driven movement and a second configuration in which they have a second relative positioning in which they define an increased-drag configuration for power control purposes; said second blade portion being positioned aft of the first; and wherein, in said second relative positioning, said first blade portion is oriented in a position in which its angle of incidence has a negative value.

In one form of the invention the blade includes a third said parallel blade portion, said first parallel blade portion being fixedly positioned at the leading edge of the aerofoil section of the blade, and in said first configuration of the blade the third blade portion is positioned between said first and second parallel blade portions to define said aerofoil section but in said second configuration said third parallel blade portion is displaced axially to separate from said first and second parallel blade portions to project outwardly from the tip of said blade.

A second aspect of the present invention provides a wind turbine rotor including a plurality of blades according to the first aspect, and preferably also means for actuating the change of configuration of each said blade to its said second configuration in response to a perceived need for power reduction.

A third aspect of the invention provides a method of operating a wind turbine wherein over at least a part of the blade span the aerofoil section is formed from at least two parallel blade portions one of which a first is a truncated leading portion of the aerofoil section and a second of which is a truncated trailing portion, and comprising reducing power output by changing the angle of incidence of said first blade portion or another said blade portion other than said second blade portion to a negative value at which the total aerodynamic force on said first blade portion has no component in the forward direction of movement of the blade.

Preferably the first blade portion has an angle of attack less than its stalling angle at said negative value of the angle of incidence.

BRIEF DESCRIPTION OF THE DRAWINGS

In order that the present invention may more readily be understood the following description is given, merely by way of example, with reference to the accompanying drawing in which:

FIG. 1 is a cross-section through a blade in accordance with the present invention, in the low drag configuration;

FIG. 2 is a view corresponding to FIG. 1 but showing the same blade in a high drag configuration;

FIG. 3 is a schematic perspective view of an embodiment of the blade in accordance with the present invention showing the linkage for driving the blade between its low and high drag configurations;

FIG. 4 is an overhead perspective view of the tip of the blade shown in FIG. 3;

FIG. 5 is a view corresponding to FIG. 2, but illustrating the airflow vectors and the lift and drag vectors;

FIG. 6 is a cross-section through an alternative embodiment of blade;

FIG. 7 is a cross-section through another embodiment of blade; and

DESCRIPTION OF THE PREFERRED EMBODIMENTS

Figure 8:
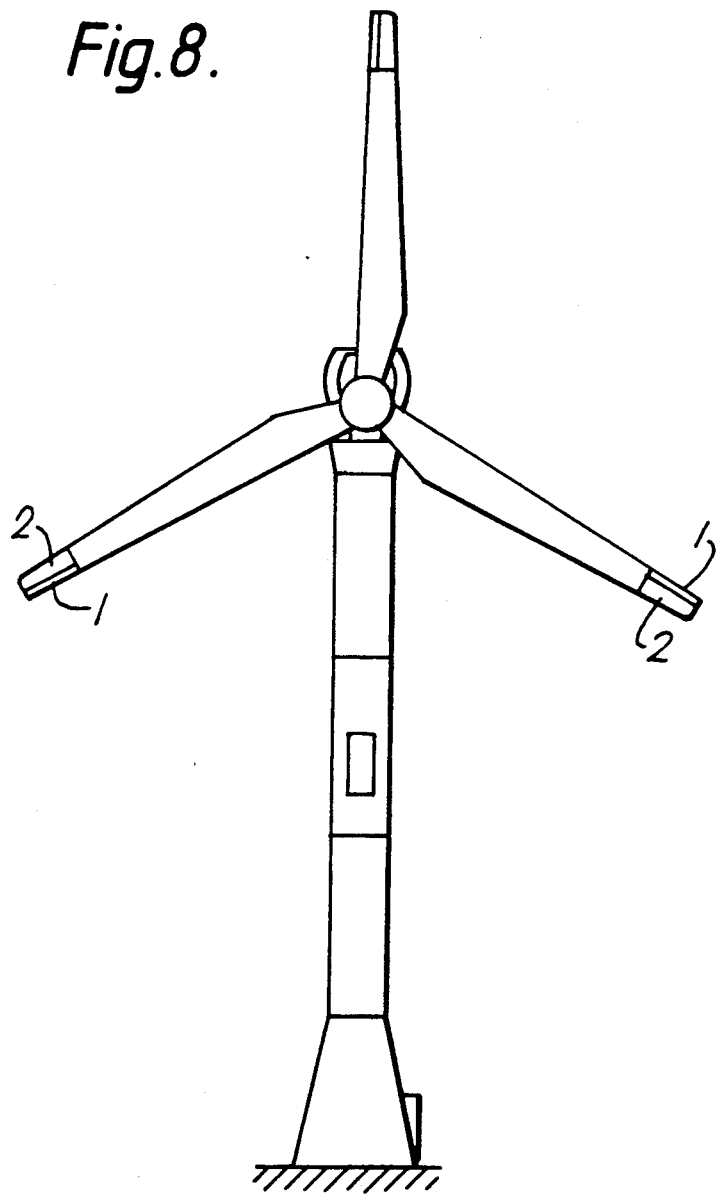
FIG. 8 illustrates the turbine rotor incorporating the blades of FIGS. 1 to 7.

FIG. 1 shows that the blade comprises a leading portion 1 and a trailing portion 2 such that the leading portion is pivotable about an axis 3 between the FIG. 1 configuration in which the leading portion is flush with the trailing portion to define therewith an aerofoil section suitable for use in a wind turbine generator. One example of such a section is LS1-MOD, having a thickness of 21%.

The front portion of the blade may include up to 50% of the chord, or even more, and the displacement of the front portion 1 from the FIG. 1 configuration to the FIG. 2 configuration is capable of changing the angle of incidence of the front portion of the blade by as much as 60°, or even more, so that preferably a substantial slot opens between the front portion 1 and the rear portion 2. The pivot axis 3 may, for example, be approximately 10% of chord.

In order to enhance the independence of the two blade portions, and in order to provide a positive stop to locate the front portion precisely in its low drag first configuration shown in FIG. 1, the rear surface 4 of the front portion 1 is preferably inclined, and the front surface 5 of the rear portion 2 is similarly inclined, to maximize the airflow through the slot 6 formed therebetween when the blade is in the FIG. 2 "high drag" configuration.

Surprisingly we have discovered that a truncated aerofoil section such as that illustrated in the cross-section of blade portion 1 in FIGS. 1 and 2, not only generates increased drag at high angles of attack, but also generates surprisingly high lift and experiences a noticeable delay of the onset of stall. For example, we have discovered that with the truncated aerofoil section shown for the blade portion 1 the stalling angle of attack can be as high as 30°.

As a result, we find that giving the leading portion of the blade 1 a high negative angle of incidence relative to a slight positive angle of incidence of the trailing portion 2 has the threefold result of firstly exposing the front surface 5 of the rear blade portion in order to increase the drag on the rear blade portion, secondly deriving high drag from the front blade portion 1 itself both by virtue of its truncated rear surface and by virtue of its high angle of attack, and thirdly generating high lift which, by virtue of the angle of attack can, particularly near the faster moving blade tip, give rise to a considerable additional component of retardation force, and hence braking torque, on the blade. By way of example FIG. 5, corresponding to FIG. 2, includes typical wind and blade airflow movement vectors which illustrate that despite the fact that the angle of attack of the blade may be of the order of 4° (near the tip) the considerably different angle of attack of the leading portion 1 gives rise to a negative angle of attack and the generation of high drag and lift force components. In FIG. 5 the component of airflow due to the blade rotation is shown at $V_b$, the component due to the wind is shown as $V_w$, the relative airflow is illustrated as $V_r$, and the lift and drag components generated from the blade portion 1 are illustrated as $L_1$ and $D_1$, respectively. As can be seen, both the lift and the drag components of the section 1 generate substantial blade-retarding force which manifests itself as a suitable torque, particularly on those parts of the blade near the faster-moving tip.

We prefer that the movable blade portion 1 be confined to the tip regions of the blade where the torque generated will be at its highest. (For example the movable blade portion 1 may extend along about 15 to 30% of the blade span). This also allows the inboard portions of the blade to be devoid of any movable sections and hence to be constructed with the required strength to resist the high and rapidly increasing blade-retarding torque sought after by the present invention.

In FIG. 3, there is shown schematically the pivot shaft 3 having a helical torsion spring 7 biasing the front blade portion 1 towards its "high drag" second position shown in FIG. 2. However, normally the biasing effect of the torsion spring 7, which is fixed at 10 to the fixed blade portion 2, is overcome by a cable 8 passing around a pulley 9 and having thereon an actuating mass 11 which is subject to centrifugal force when the wind turbine rotor carrying the blade 1, 2 is in rotation. In the absence of such centrifugal force, tension induced in the cable 8 by virtue of a biasing spring 25 or other actuator, not shown, holds the front blade portion 1 in its "low drag" first position which is shown in FIG. 1, and does so against the biasing effect of the spring 7. As the blade speed increases to a critical speed at which the rotor power needs to be reduced to maintain control, the centrifugal force on the mass 11 tends to assist the biasing effort of the spring 7 so that the front blade portion 1 begins to displace progressively towards its "high drag" second position shown in FIG. 2.

The system described above, involving progressive variation of the position of the front blade portion 1 for controlling the speed of the turbine rotor is suitable for any conventional rotor where both speed control and the prevention of overspeed by extreme corrective action are required.

However, it is known to design wind turbine rotors of the stall regulated type where no active control of the speed is needed during normal operation, by virtue of the power/wind speed curve flattening off at a given power level beyond a critical wind speed region. However, such rotors still require some means of preventing overspeed in the event of sudden loss of load and for these purposes a simpler type of control may be required so as merely to deflect the leading portion 1 rapidly into its high negative incidence configuration once overspeed (for example resulting from sudden load loss) is detected.

For such pure prevention of overspeed, means may be provided for ensuring rapid displacement of the blade towards its FIG. 2 configuration, for example by having the cable 8 not pulling the front blade portion 1 progressively towards the "low drag" first position but instead holding "on" a catch 15 serving as latch means operative to be released by slackening of the cable and immediately frees the front blade portion 1 for movement towards the "high drag" second position under the influence of the spring 7 but without any further impedance from the tension in the cable 8. This catch 15 may, for example, be based on clutches or disc springs.

On the other hand, where there is no stall regulation characteristic to the turbine blade, active control of the blade forces may be required and for this purpose the cable 8 may be wound in or paid out, for example by means of electric motors, in response to signals depending on the rotor speed. Whereas, normally, a wind turbine generator has its speed of rotation electrically held by virtue of its connection to the constant frequency AC grid, circumstances may arise when the power tends to rise giving a slight tendency for excess speed, in which case the corrective action facilitated by the present invention is helpful.

As an alternative to the cable 8 for altering the blade angle where active control is required, the necessary control may instead be effected by means of rigid levers, or a hydraulic transmission. In either case the biasing effect of the coil spring 7 may be used to assist the blade control system as required. Such a lever system, but driven hydraulically, is shown in FIG. 4 for the purposes of illustration. It will of course be appreciated that the various actuating systems just described can be used with any embodiment of the present invention.

FIG. 4 shows an overhead perspective view of the blade of FIG. 3, but at the tip region. The shaft 3 can thus be mounted at each end in fixed leading portions of the blade while the movable leading portion 1 is freely rotatable thereon.

In this case the driving linkage to the front blade portion 1 is a hydraulically actuated lever system comprising levers 13 driven by a ram 14, but again with a centrifugal weight 11 to assist in the overspeed prevention function.

Where such active control is envisaged, it will of course be important that deflection of the front blade portion 1 into its negative incidence configuration is able to be sufficiently pronounced to allow not only progressive blade power controlling action, but also the more exaggerated power dumping action necessary for overspeed prevention.

In all cases, the coil spring 7 may provide a fail-safe situation in that the front blade portion 1 will automatically deploy to the "high drag" second position in the event of failure of the cable 8 or any linkage alternative thereto.

It is envisaged that the blade in accordance with the present invention may be incorporated in a horizontal axis type of wind turbine, or in a vertical axis type, for example a Musgrove turbine.

The advantages of the overspeed prevention method and apparatus in accordance with the present invention are as follows:

(a) the deployment of the movable front blade portion 1 to its "high drag" FIG. 2 configuration generates a strong negative lift (despite the use of highly negative angles of incidence without stalling) which helps to balance out the positive lift forces on the trailing portion 2 and generates a considerable component of force slowing down the movement of the blade;

(b) the increased drag from the movable front portion 1 at these highly negative angles of incidence in the "high drag" second position contributes to the blade-retarding action;

(c) the preferred existence of the slot 6 between the two blade portions 1 and 2 is expected to allow the front blade portion 1 to generate its lift and drag independently of the increased drag which will in any case derive from the rear blade portion 2, allowing both of these blade portions to generate drag to retard the blade; and (d) the use of a simple pivot mechanism to support the front blade portion 1 during its movement between the "low drag" first position and the "high drag" second position allows the front blade portion to be strongly supported at both of its ends by relatively simple and cheap mechanism which equally permits relatively simple and cheap actuation linkage for the movable blade portion 1.

Although in FIGS. 1 and 2 the rear surface 4 of the front blade portion 1 and the front surface 5 of the rear blade portion 2 are shown as planar faces oblique to the blade chord, it will of course be understood that alternative arrangements may be provided such that the drag on the fixed rear blade portion 2 becomes increased as the slot 6 opens. For example, the planar oblique faces may instead be curved with a convex face on the back of the leading portion of the aerofoil and a concave face on the trailing portion. The curved surface may be either circular or of any other form which allows the necessary separation of these surfaces when the blade portions move from the low drag position to the high drag position.

Another possibility is for the front of the rear blade portion 2 to have forwardly extending lips 2a and 2b which are thought to increase the drag considerably when these lips are exposed upon movement of the front blade portion 1 to its high drag position. Such a configuration is shown in FIG. 7. In the low drag position the lips 2a and 2b of the rear portion are flush with corresponding lips 1a and 1b, respectively, of the front blade portion.

Yet a further possibility is for the blade to be formed of three separate blade portions (or even more) of which the front and the rear portions remain in position while an intermediate portion pivots to a negative incidence position for a high drag configuration. Such an arrangement is shown in FIG. 6 where the front blade portion 21 and the rear blade portion 22 are both fixed while an intermediate movable blade portion 23 pivots in the anti-clockwise direction about its pivot axis 24 to attain the necessary high drag configuration. Other various embodiments are possible where a portion of the blade other than the trailing portion moves to a high negative incidence position in order to generate the required high retarding force for power dumping.

As a modification of FIG. 6, it is possible for the movement of the third blade portion 23 to be one of pure axial translation to open up an even wider slot between the first and second blade portions 21 and 22 than is possible by pure pivoting. The axial movement of the portion 23 is normally axially outwardly so as to extend the span of the blade and thereby to project into an airstream outwardly of the rotor disc where the moment of the drag of portion 23 is higher and the moment of inertia of the rotor is also higher.

In all of the above described embodiments, the drag generated by the rear blade portion may be augmented by the existence of air inlet passages from the surface 5 to discharge orifices in the principal surfaces of the rear blade portion 2 for inducing premature airflow separation and increased drag once the movable blade portion has been deployed to its "high drag" position.

I claim:

1. A turbine rotor comprising a plurality of blades each having:
   (a) first and second parallel blade portions which have a first configuration in which the first and second parallel blade portions have a first relative positioning in which they co-operate in forming an aerofoil section for airflow-driven movement and a second configuration in which they have a second relative positioning in which they define an increased-drag configuration for power control purposes;
   (b) means mounting said second blade portion aft of the first blade portion; and
   (c) pivot means mounting said first blade portion for movement to a position in said second relative positioning in which it is oriented with an angle of incidence giving negative lift.

2. A rotor according to claim 1, wherein said pivot means is spaced from said second blade portion for allowing movement of said first blade portion relative to said second blade portion between said first and second relative positionings.

3. A rotor according to claim 2, wherein said first blade portion includes the leading edge of the aerofoil section and the pivot axis is adjacent the leading edge.

4. A rotor according to claim 3, wherein said pivot axis is substantially at 10% chord of the aerofoil section.

5. A blade for a turbine, said blade comprising:
   (a) first and second parallel blade portions which have a first configuration in which the first and second parallel blade portions have a first relative positioning in which they co-operate in forming an aerofoil section for airflow-driven movement and a second configuration in which they have a second relative positioning in which they define an increased-drag configuration for power control purposes;
   (b) means mounting said second blade portion aft of the first blade portion;
   (c) pivot means mounting said first blade portion for movement to a position in which it is oriented with a negative angle of incidence in said second relative positioning;
   (d) resilient biasing means for biasing said first and second blade portions towards said second relative positioning; and
   (e) means for actuating movement of said first blade portion to said first relative positioning by overcoming the biasing effect of said resilient biasing means.

6. A blade for a turbine, said blade comprising:
   (a) first and second parallel blade portions which have a first configuration in which the first and second parallel blade portions have a first relative positioning in which they co-operate in forming an aerofoil section for airflow-driven movement and a second configuration in which they have a second relative positioning in which they define an increased-drag configuration for power control purposes;
   (b) means mounting said second blade portion aft of the first blade portion; and
   (c) pivot means mounting said first blade portion for movement to a position in which it is oriented with a negative angle of incidence in said second relative positioning, wherein said first blade portion is confined to only part of the blade span and extends to the tip of the blade.

7. A blade for a turbine, said blade comprising:
   (a) first and second parallel blade portions which have a first configuration in which the first and second parallel blade portions have a first relative positioning in which they co-operate in forming an aerofoil section for airflow-driven movement and a second configuration in which they have a second relative positioning in which they define an increased-drag configuration for power control purposes;
   (b) means mounting said second blade portion aft of the first blade portion;
   (c) pivot means mounting said first blade portion for movement to a position in which it is oriented with a negative angle of incidence in said second relative positioning; and
   (d) a third blade portion parallel to said first and second parallel blade portions, said third parallel blade portion being positioned at the leading edge of the aerofoil section of the blade and being fixed such that in the said first relative positioning the first blade portion is positioned between said second and third parallel blade portions but in said second relative positioning said first parallel blade portion separates from said second parallel blade portion to adopt said position of negative angle of incidence.

8. A blade according to claim 7, and including latch means for latching said first and second blade portions in said first relative positioning, and (ii) speed-responsive means operative to release said latch means.

9. A blade according to claim 7, and including means for progressively moving said first blade portion from said first relative positioning to said second relative positioning.

10. A blade for a turbine rotor, said blade comprising:
    first and second parallel blade portions which have a first configuration in which the first and second parallel blade portions have a first relative positioning in which they co-operate in forming an aerofoil section for airflow-driven movement and a second configuration in which they have a second relative positioning in which they define an increased-drag configuration for power control purposes;
    (b) means mounting said second blade portion aft of the first blade portion;
    (c) pivot means mounting said first blade portion for movement to a position in which it is oriented with a negative angle of incidence in said second relative positioning; and
    (d) means responsive to the speed of the turbine rotor for automatically changing the blade configuration from said first configuration to said second configuration upon attainment of a predetermined turbine rotor speed or turbine rotor speed range.

11. A turbine rotor comprising a plurality of blades each having:
    (a) first and second parallel blade portions which have a first configuration in which the first and second parallel blade portions have a first relative positioning in which they co-operate in forming an aerofoil section for airflow-driven movement and a second configuration in which they have a second relative positioning in which they define an increased-drag configuration for power control purposes;
    (b) means mounting said second blade portion aft of the first blade portion;
    (c) pivot means mounting said first blade portion for movement to a position in said second relative positioning in which it is oriented with an angle of incidence giving negative lift; and
    (d) forwardly extending lips attached to said second blade portion, which project into the airstream when the parallel blade portions are in their second relative positioning but form part of the aerofoil surface when the blade portions are in their first relative positioning.

12. A blade for a turbine, said blade comprising:
    (a) first and second parallel blade portions which have a first configuration in which the first and second parallel blade portions have a first relative positioning in which they co-operate in forming an aerofoil section for airflow-driven movement and a second configuration in which they have a second relative positioning in which they define an increased-drag configuration for power control purposes;
    (b) means mounting said second blade portion aft of the first blade portion;

(c) pivot means mounting said first blade portion for movement to a position in which it is oriented with a negative angle of incidence in said second relative positioning;

(d) resilient biasing means for biasing said first and second blade portions towards said second relative positioning; and (e) means for actuating movement of said first blade portion to said first relative positioning by overcoming the biasing effect of said resilient biasing means;

wherein said actuating means includes a mass able to move spanwise of said blade in response to centrifugal forces arising during blade rotation in operation, and said centrifugally induced movement assists the biasing of said resilient biasing means."

13. A blade for a turbine, said blade comprising:

(a) first and second parallel blade portions which have a first configuration in which the first and second parallel blade portions have a first relative positioning in which they co-operate in forming an aerofoil section for airflow-driven movement and a second configuration in which they have a second relative positioning in which they define an increased-drag configuration for power control purposes;

(b) means mounting said second blade portion aft of the first blade portion;

(c) pivot means mounting said first blade portion for movement to a position in which it is oriented with a negative angle of incidence in said second relative positioning;

(d) resilient biasing means for biasing said first and second blade portions towards said second relative positioning;

(e) latch means for latching said first and second blade portions in said first relative positioning; and (f) latch releasing means for releasing said latch means in response to attainment of an overspeed condition to permit movement of said second blade portion to said first relative positioning.

14. A blade according to claim 13, wherein said first blade portion occupies no more than 30% of the blade span.

15. A blade for a turbine, comprising first, second and third parallel blade portions the blade having a first configuration defining an aerofoil section for airflow-driven movement and a second configuration in which a slot is formed between said first blade portion and said second blade portion which is spaced therefrom to define an increased-drag configuration for power control purposes, wherein said first parallel blade portion is fixedly positioned at the leading edge of the aerofoil section of the blade and wherein in said first configuration of the blade the third blade portion is positioned between said first and second parallel blade portions to define said aerofoil section but in said second configuration said third parallel blade portion is displaced axially to separate from said first and second parallel blade portions to project outwardly from the tip of said blade.

16. A method of operating a wind turbine having a rotor comprising a plurality of blades, and wherein over at least a part of the blade span the aerofoil section is formed from at least two parallel blade portions one of which is a truncated leading portion of the aerofoil section and another of which is a truncated trailing portion, and comprising the step of reducing power output by changing the angle of incidence of a first said blade portion other than the trailing portion to a negative value at which the total aerodynamic force on said first blade portion has no component in the forward direction of movement of the blade.

17. A method according to claim 16, wherein the first blade portion has an angle of attack less than its stalling angle at said negative value of the angle of incidence.

18. A method of operating a wind turbine according to claim 16, wherein the change in the angle of incidence of said first blade portion is effected by pivoting it around an axis close to the leading edge of the aerofoil section, and wherein the change in the angle of incidence does not involve span-wise movement of said first aerofoil portion.

19. A method according to claim 16, wherein the change in angle of incidence is progressively effective for controlling the power generated by said rotor, and wherein displacement to change the incidence of said first blade portion to its negative value is effected rapidly in order to correct an overspeed situation resulting from sudden loss of load.

* * * * *